US007153600B2

(12) United States Patent
Andreas-Schott et al.

(10) Patent No.: US 7,153,600 B2
(45) Date of Patent: Dec. 26, 2006

(54) INTEGRATED CELL VOLTAGE MONITORING MODULE

(75) Inventors: Benno Andreas-Schott, Pittsford, NY (US); Joachim Lauk, Bodenheim (DE); Stephen Raiser, Egelsbach (DE)

(73) Assignee: General Motors Corporation, Detroit, MI (US)

( * ) Notice: Subject to any disclaimer, the term of this patent is extended or adjusted under 35 U.S.C. 154(b) by 344 days.

(21) Appl. No.: 10/785,792

(22) Filed: Feb. 24, 2004

(65) Prior Publication Data

US 2005/0186456 A1 Aug. 25, 2005

(51) Int. Cl.
*H01M 8/04* (2006.01)
*H01M 2/00* (2006.01)
(52) U.S. Cl. ............................... 429/23; 429/34
(58) Field of Classification Search ................. 429/23, 429/34, 13, 21
See application file for complete search history.

(56) References Cited

U.S. PATENT DOCUMENTS 6,933,069 B1 * 8/2005 Sato et al. ................. 429/34

FOREIGN PATENT DOCUMENTS

WO    WO 03/083977 A2   10/2003

* cited by examiner

*Primary Examiner*—Patrick Joseph Ryan
*Assistant Examiner*—Thomas H. Parsons
(74) *Attorney, Agent, or Firm*—Charles H. Ellerbrock

(57) ABSTRACT

An integrated cell voltage unit for monitoring the voltage of each fuel cell in a fuel cell stack that is easily and reliably electrically coupled to the bipolar plates of the fuel cell stack. The bipolar plates of the fuel cell stack are equipped with a specialized tab connector that engages with a corresponding electrical connector on the cell voltage unit. Either the tab connectors on the bipolar plates or the corresponding connectors on the cell voltage unit include flexible members to provide a suitable electrical friction engagement. The cell voltage unit is attached to the bipolar plates and does not require its own separate housing. In one embodiment, the housing of the fuel cell stack includes a recessed portion in which the cell voltage unit is positioned.

20 Claims, 6 Drawing Sheets

INTEGRATED CELL VOLTAGE MONITORING MODULE

BACKGROUND OF THE INVENTION

1. Field of the Invention

This invention relates generally to an integrated cell voltage unit for monitoring a fuel cell stack and, more particularly, to an integrated cell voltage unit for monitoring a fuel cell stack that includes snap fit electrical connections to easily connect the bipolar plates of the fuel cell stack to the unit.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The combination of the anode, cathode and membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Many fuel cells are typically combined in a fuel cell stack to generate the desired power. The fuel cell stack receives a cathode charge gas that includes oxygen, and is typically a flow of forced air from a compressor. Not all of the oxygen in the air is consumed by the stack and some of the air is output as a cathode exhaust gas that may include water as a stack by-product. Also, the fuel cell stack receives an anode hydrogen gas.

Each fuel cell in the fuel cell stack includes opposing bipolar plates having flow channels through which the anode gas, the cathode gas and a cooling fluid flow. A cell membrane is positioned between the bipolar plates in each fuel cell, and receives the cathode gas and the anode gas to generate the electricity in the manner discussed above. The bipolar plates are conductive members, such as stainless steel, that are coupled in series and collect the electrical current generated by the fuel cell stack to be output therefrom. In a typical fuel cell stack for an automotive application, there are about 200 fuel cells, and thus, about 200 bipolar plates.

It is necessary to monitor the electrical potential of each bipolar plate during operation of the fuel cell stack to ensure that each fuel cell in the stack is operating properly. If one of the fuel cells in the stack is not generating the proper amount of current, the entire stack could be damaged. Therefore, each bipolar plate is electrically coupled to a cell voltage unit (CVU) that monitors the voltage of each cell and the overall output power of the fuel cell stack.

FIG. 1 is a top plan view of a known fuel cell system 10 including a fuel cell stack 12 mounted in a fuel cell module housing 14. The fuel cell stack 12 includes a series of bipolar plates, as discussed above, each including an electrical tab 16 to which an electrical wire 20 is electrically coupled. The end of the wire 20 includes an electrical connector (not shown) that fits onto the tab 16 in an electrical friction-fit engagement. The system 10 further includes a plurality of CVUs 22 electrically coupled in series, and positioned within a housing 24. The CVUs 22 monitor the voltage output of each individual cell within the stack 12 and the total output voltage of the stack. To accomplish this, each of the wires 20 is coupled to a certain one of the CVUs 22. For the fuel cell system 10, six of the adjacent wires 20 are coupled to a common connector plug or wire harness 26 that is then coupled to the appropriate CVU 22.

In the known fuel cell systems, each electrical connection to the bipolar plates and the CVUs 22 are performed manually. Because there are typically a few hundred cells in the fuel cell stack 12, manually coupling the wire harnesses 26 to the CVU 22 and the wires 20 to the bipolar plate tabs is extremely labor intensive. Other disadvantages are also present in this type of assembly process. For example, it is possible to interchange the wires 20 during assembly so that they are not connected to the proper bipolar plate. Further, the wires 20 and harnesses 26 require a significant amount of space. Also, the CVUs 22 require their own housing separate from the fuel cell module housing 14. Furthermore, the assembly process is not designed for manufacturing and assembly.

SUMMARY OF THE INVENTION

In accordance with the teachings of the present invention, an integrated cell voltage unit (CVU) is disclosed for monitoring the voltage of each fuel cell in a fuel cell stack, where the unit is easily and reliably electrically coupled to the bipolar plates of the fuel cell stack. The bipolar plates of the fuel cell stack are equipped with a specialized tab connector that engages with a corresponding connector on the CVU. Either the tab connector on the bipolar plate or the corresponding connector on the CVU includes flexible members to provide a suitable electrical friction engagement. The CVU is attached to the bipolar plates by the connectors and is held in place by the housing of the fuel cell stack so that it does not require its own separate housing. In one embodiment, the housing of the fuel cell stack includes a recessed portion in which the CVU is positioned.

Additional advantages and features of the present invention will become apparent from the following description and appended claims, taken in conjunction with the accompanying drawings.

DETAILED DESCRIPTION OF THE INVENTION

The following discussion of the embodiments of the invention directed to an integrated cell voltage unit for monitoring a fuel cell stack is merely exemplary in nature, and is in no way intended to limit the invention or its applications or uses. For example, the discussion below describes the fuel cell module as being for a vehicle. However, as will be appreciated by those skilled in the art, the fuel cell module can be used for other applications.

Figure 1:
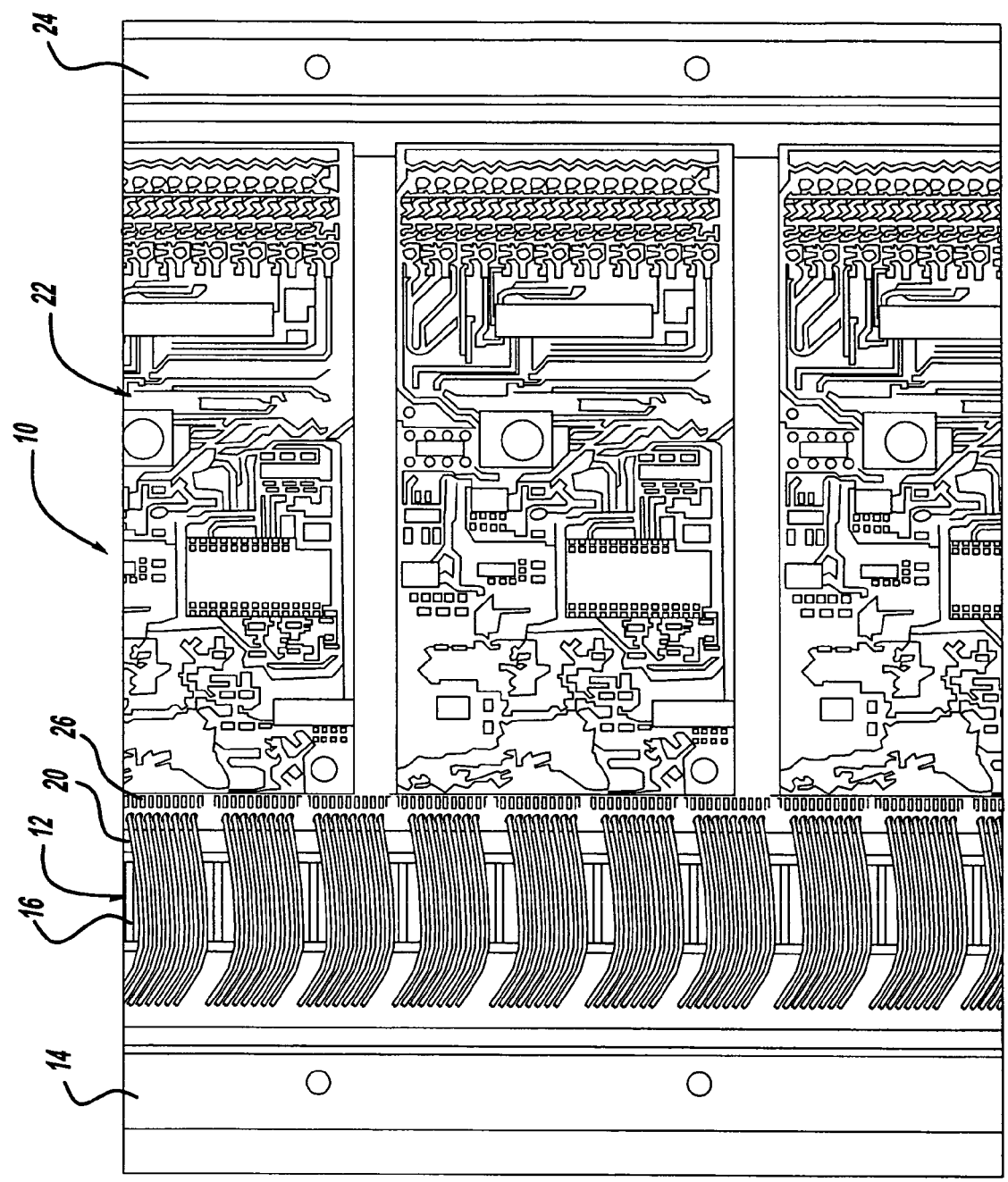
FIG. 1 is a perspective view of a known fuel cell system including a fuel cell stack electrically coupled to a series of cell voltage units by a plurality of wires for monitoring the output voltage of the fuel cells in the stack.
Figure 2:
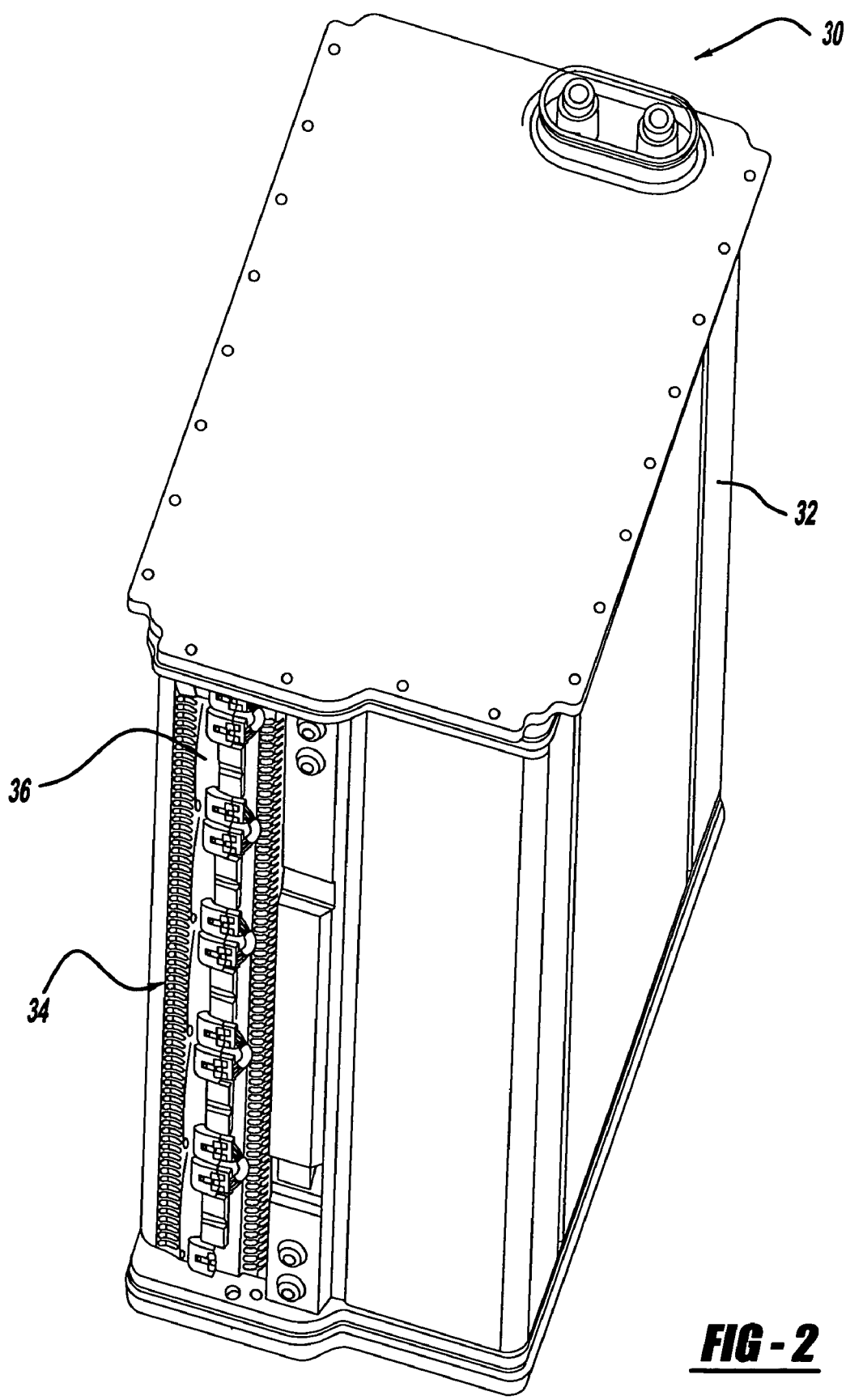
FIG. 2 is a perspective view of a fuel cell module including an integrated cell voltage unit assembly mounted thereto, according to an embodiment of the present invention.

FIG. 2 is a perspective view of a fuel cell module (FCM) 30 including a housing 32 that encloses a fuel cell stack (not shown). As discussed above, the fuel cell stack includes a stack of electrically coupled fuel cells, where each fuel cell includes opposing bipolar plates having a membrane positioned therebetween. According to the invention, the FCM 30 includes a cell voltage unit (CVU) assembly 34 that is integrated with FCM 30, and thus does not require its own separate housing. In one embodiment, the FCM 30 provides power to a vehicle. However, this is by way of a non-limiting example.

Figure 3:
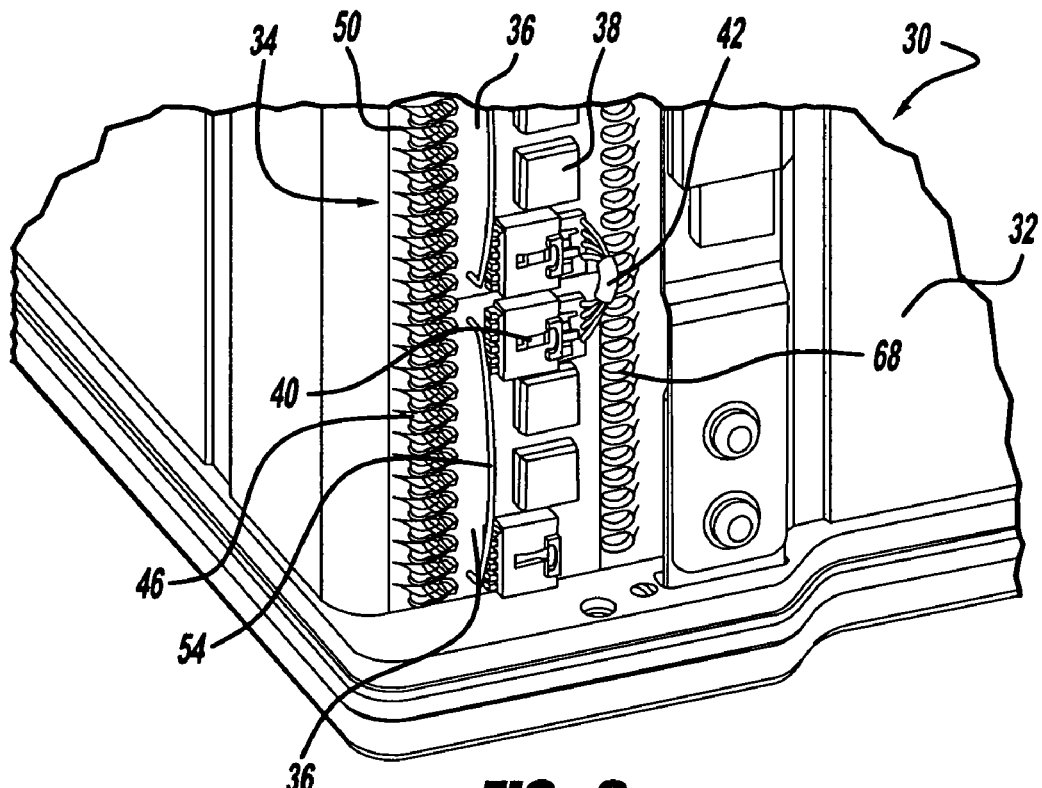
FIG. 3 is a broken-away, close-up, perspective view of a portion of the fuel cell module shown in FIG. 2.

FIG. 3 is a blown-up, broken-away, perspective view of the FCM 30. The integrated CVU assembly 34 includes a plurality of CVUs 36 electrically coupled in series depending on the number of fuel cells in the stack. Each CVU 36 includes a plurality of processing modules 38 and electrical connectors 40. Wires 42 are coupled to adjacent connectors 40 in adjacent CVUs 36 so that the CVUs 36 are electrically coupled together. The CVU assembly 34 monitors the voltage of each bipolar plate in the stack and the overall voltage of the stack, and provides signals indicative of these voltages on an output bus (not shown).

Figure 4:
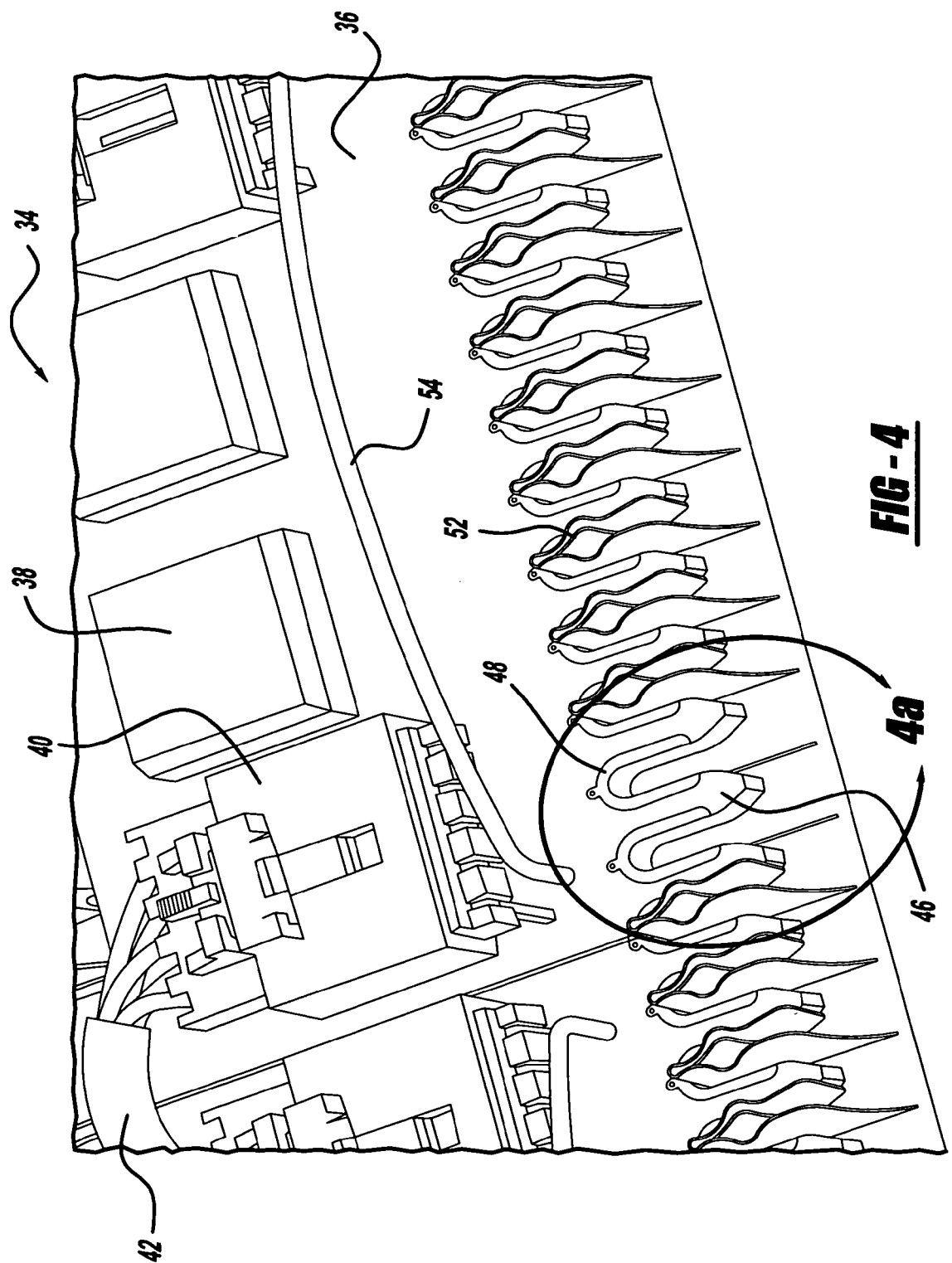
FIG. 4 is a broken-away, perspective view of the integrated cell voltage unit separated from the fuel cell module showing the electrical connections between the unit and connector tabs on the bipolar plates of the fuel cell stack.
Figure 4A:
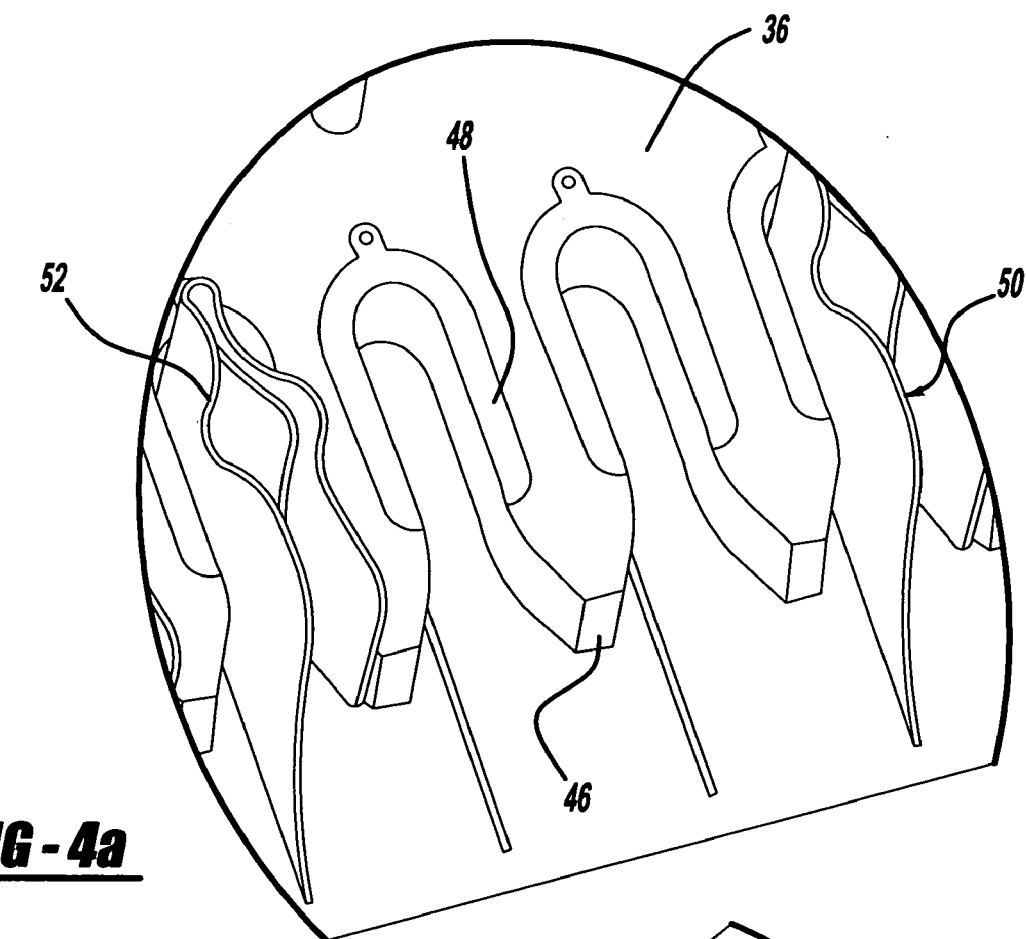
FIG. 4a is a close-up view of a few of the connectors in the integrated cell voltage unit shown in FIG. 4.

FIG. 4 is a broken-away, close-up view of two adjacent CVUs 36 in the assembly 34. Each CVU 36 includes a plurality of spaced apart U-shape electrical slot connectors 46 having electrical metal couplers 48 that are electrically connected to the processing modules 38. In one embodiment, the couplers 48 are made of a copper/gold composite. Each CVU 36 includes a row of the connectors 46 on each side of the unit 36, as shown. FIG. 4a shows a close-up view of a couple of adjacent connectors 46. Each bipolar plate includes an electrical connector tab 50 that is inserted into the appropriate connector 46. Each connector tab 50 includes flexible metal portions 52 that compress together when they are inserted into the slot connectors 46 to make a good electrical contact with the electrical couplers 48.

Each CVU 36 includes a retention spring 54 that pushes the CVU 36 against the housing 32 to help hold it in place. During the assembly process, the CVU 36 is pushed onto cooperating ramps 68 on the housing 32 so that the connector tabs 50 can be readily snapped into the connectors 46. Thus, the configuration of the connectors 46 and the connector tabs 50 allow the CVU assembly 34 to be coupled to the fuel cell stack in a simple snapping motion to secure and electrically couple the CVUs 36 to the FCM 30. Therefore, the FCM 30 eliminates the wires and wire harnesses that were associated with the prior art fuel cell modules, and all of the disadvantages that can be attributed to that design.

Figure 5A:
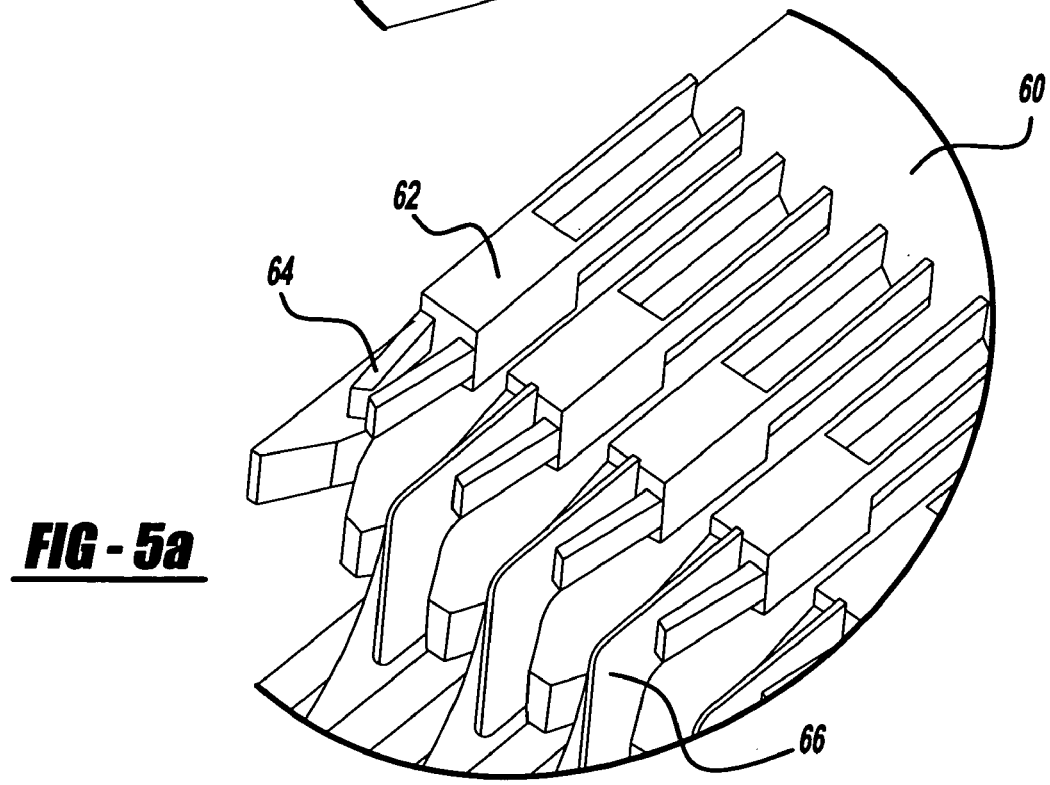
FIG. 5a is a close-up view of a few of the connectors of the cell voltage unit shown in FIG. 5.
Figure 5:
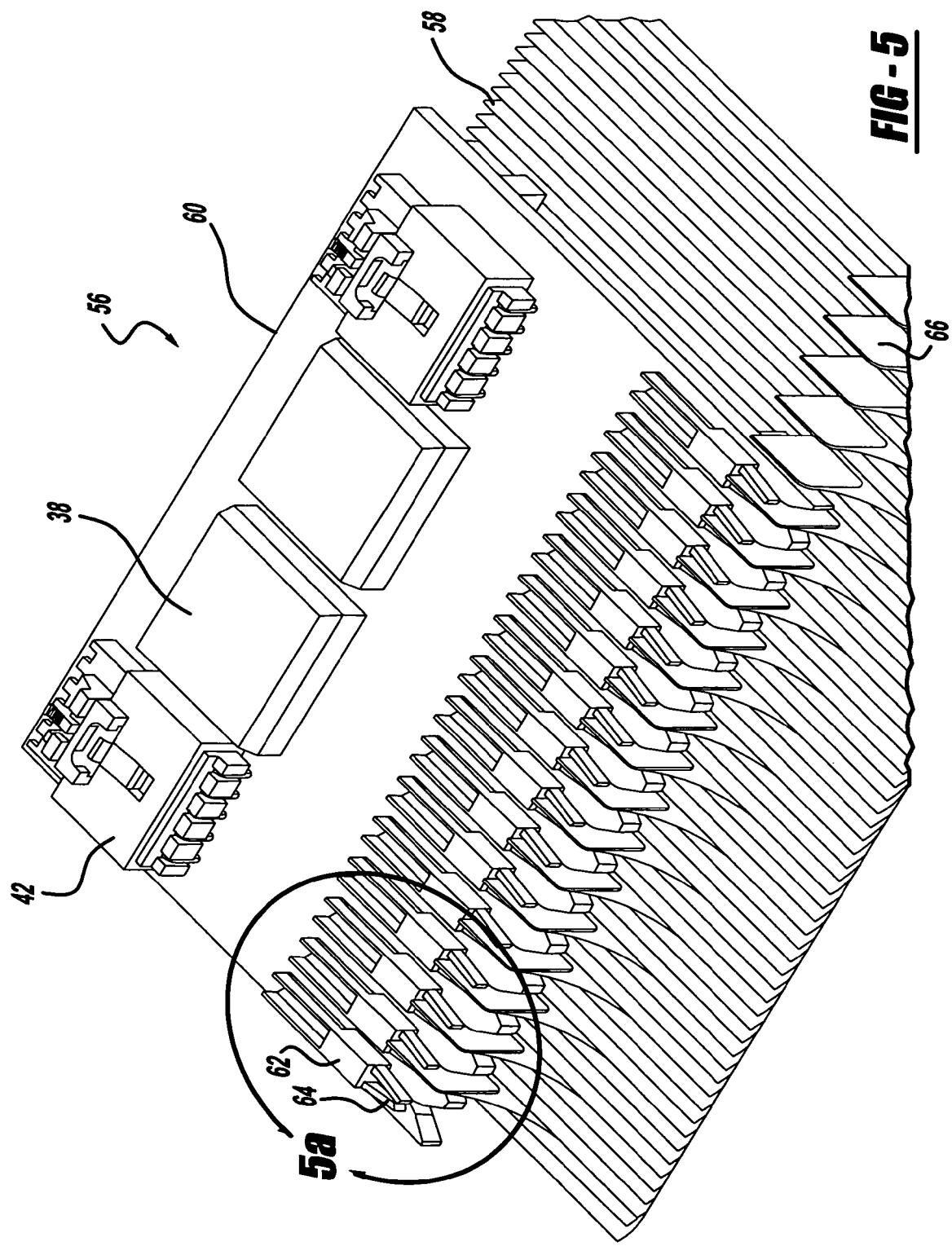
FIG. 5 is a perspective view of a cell voltage unit employing a different type of connector than the cell voltage unit shown in FIG. 4, according to another embodiment of the present invention.

FIG. 5 is a perspective view of a CVU assembly 56 for monitoring a fuel cell stack, according to another embodiment of the present invention, where like reference numerals identify like elements. Bipolar plates 58 are more clearly shown in FIG. 5 that would be part of the fuel cell stack in the FCM 30. In this design, the CVU assembly 56 includes a CVU 60 having electrical couplers 62. The electrical connectors 62 are automotive-type connectors that include flexible fingers 64. The bipolar plates 58 include extended tabs 66 that are inserted between the fingers 64. FIG. 5a is a close-up view of a few of the connectors 62 and the tabs 66. During the electrical connection process, the fingers 64 separate to accept the tabs 66 in a friction fit engagement and apply pressure to the tabs 66 to make a good electrical connection therebetween. Therefore, the CVU 60 can be easily and readily secured to the bipolar plates 58 in a snap fit engagement, thus reducing the assembly time.

Figure 6:
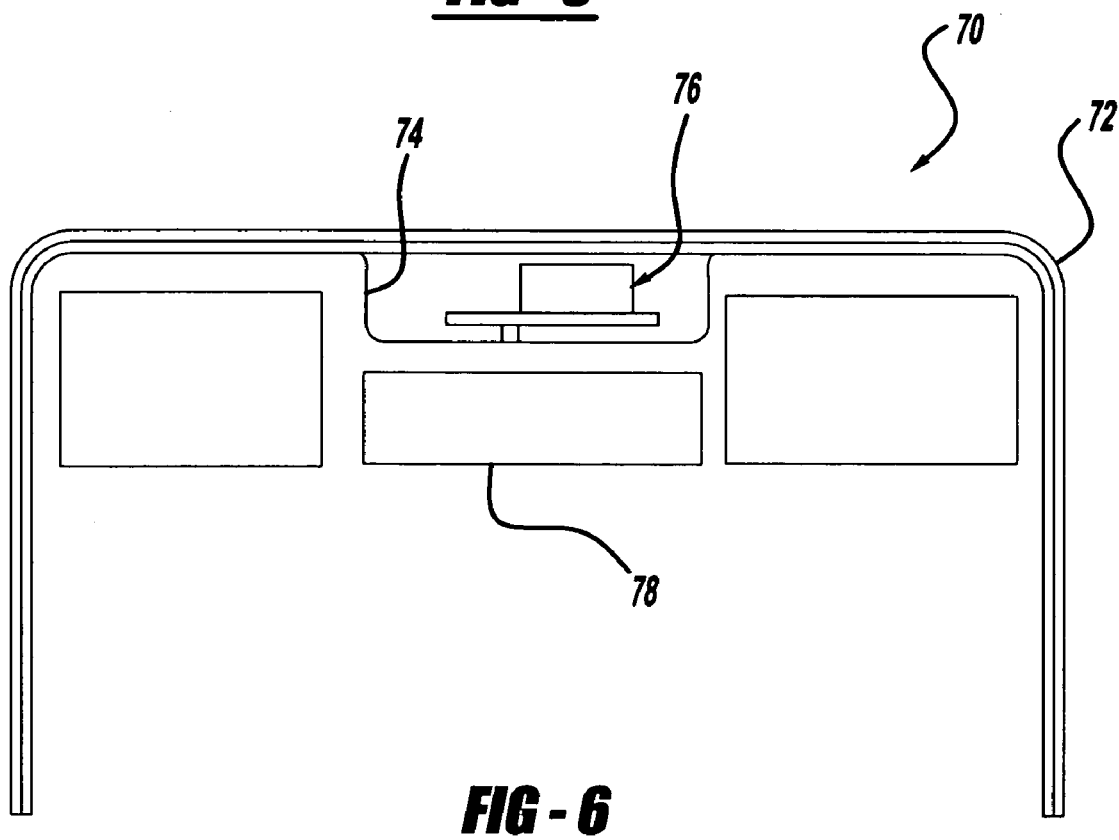
FIG. 6 is cross-sectional view of an integrated cell voltage unit within the housing of a fuel cell stack.

As shown in FIGS. 2 and 3, the housing 32 includes a "bumped out" portion to which the CVU assembly 34 is mounted. FIG. 6 is a cross-sectional view of an FCM 70 including a housing 72, according to another embodiment of the invention. The housing 72 includes a recessed elongated channel 74 that accepts a CVU assembly 76 to eliminate the bumped out portion of the housing. The CVU assembly 76 can be coupled to bipolar plates of the stack in any suitable manner consistent with the discussion herein. Flow channels 78 are shown extending through the FCM 70.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell module comprising:
   a housing;
   a fuel cell stack positioned within the housing, said fuel cell stack including a stack of fuel cells having a plurality of bipolar plates, each bipolar plate including an electrical connector tab; and
   a cell voltage unit for monitoring the voltage of the fuel cells, said cell voltage unit being attached to the bipolar plates and in contact with the housing, said cell voltage unit including a plurality of electrical connectors that directly accept the tabs in an electrical friction engagement so that the cell voltage unit can be directly coupled to the plurality of bipolar plates in a snap-fit connection.

2. The fuel cell module according to claim 1 wherein the electrical connectors are U-shaped connectors including inside metal portions.

3. The fuel cell module according to claim 2 wherein the tabs include flexible portions that secure the tabs within the connectors in a friction-fit engagement to make electrical contact with the metal portions.

4. The fuel cell module according to claim 1 wherein the connectors include resilient fingers for holding the tabs in a friction-fit engagement.

5. The fuel cell module according to claim 1 wherein the housing includes a recessed portion in which the cell voltage unit is mounted.

6. The fuel cell module according to claim 1 wherein the cell voltage unit includes a row of the connectors.

7. The fuel cell module according to claim 1 wherein the cell voltage unit includes a retention spring for holding the cell voltage unit to the housing.

8. The fuel cell module according to claim 1 wherein the cell voltage unit is one of a plurality of cell voltage units electrically coupled together.

9. The fuel cell module according to claim 1 wherein the module is part of a fuel cell engine on a vehicle.

10. A fuel cell module comprising:
    a housing;
    a fuel cell stack positioned within the housing, said fuel cell stack including a stack of fuel cells having a plurality of bipolar plates, each plate including an electrical connector tab; and
    a cell voltage unit assembly for monitoring the voltage of the fuel cells, said cell voltage unit assembly including at least one cell voltage unit attached to the bipolar plates and in contact with the housing, said cell voltage unit including a plurality of electrical connectors, said electrical connectors including resilient fingers for engaging and holding the tabs in a friction-fit engagement so that the cell voltage unit can be directly coupled to the plurality of bipolar plates in a snap-fit connection.

11. The fuel cell module according to claim 10 wherein the housing includes a recessed portion in which the cell voltage unit assembly is positioned.

12. The fuel cell module according to claim 10 wherein the cell voltage unit includes a retention spring for holding the cell voltage unit to the housing.

13. A fuel cell module comprising:
    a housing;
    a fuel cell stack positioned within the housing, said fuel cell stack including a stack of fuel cells having a plurality of bipolar plates, each plate including an electrical connector tab, each connector tab including flexible metal portions; and
    a cell voltage unit assembly for monitoring the voltage of the fuel cells, said cell voltage unit assembly including at least one cell voltage unit attached to the bipolar plates and in contact with the housing, said cell voltage unit including a plurality of electrical connectors, said electrical connectors being U-shaped connectors including inside metal portions that directly accept the flexible metal portions of the tabs in an electrical friction-fit engagement so that the cell voltage unit can be directly coupled to the plurality of bipolar plates in a snap-fit connection.

14. The fuel cell module according to claim 13 wherein the housing includes a recessed portion in which the cell voltage unit assembly is positioned.

15. The fuel cell module according to claim 13 wherein the cell voltage unit includes a retention spring for holding the cell voltage unit to the housing.

16. A method for electrically coupling a cell voltage unit to a fuel cell stack, said fuel cell stack including a stack of fuel cells having a plurality of bipolar plates, each plate including an electrical connector tab, said cell voltage unit including a plurality of electrical connectors, said method comprising:
    providing a housing;
    mounting the fuel cell stack within the housing; and
    attaching the cell voltage unit to the bipolar plates so that the electrical connectors directly accept the tabs in an electrical friction-fit engagement and the cell voltage unit is in contact with the housing so that the cell voltage unit can be directly coupled to the plurality of bipolar plates in a snap-fit connection.

17. The method according to claim 16 wherein the electrical connectors are U-shaped connectors including inside metal portions.

18. The method according to claim 17 wherein the tabs include flexible portions that secure the tabs within the connectors in a friction-fit engagement to make electrical contact with the metal portions.

19. The method according to claim 16 wherein the connectors include resilient fingers for holding the tabs in a friction-fit engagement.

20. The method according to claim 16 wherein attaching the cell voltage unit to the bipolar plates includes positioning the cell voltage unit within a recessed portion in the housing.

* * * * *